United States Patent
Tzidon et al.

(10) Patent No.: US 8,314,928 B2
(45) Date of Patent: Nov. 20, 2012

(54) HIGH PRECISION WIDE-ANGLE ELECTRO-OPTICAL POSITIONING SYSTEM AND METHOD

(75) Inventors: Aviv Tzidon, Tel Aviv (IL); Dekel Tzidon, Hod Hasharon (IL)

(73) Assignee: Eye Point Ltd., Hod Hasharon (IL)

( * ) Notice: Subject to any disclaimer, the term of this patent is extended or adjusted under 35 U.S.C. 154(b) by 692 days.

(21) Appl. No.: 10/583,867

(22) PCT Filed: Dec. 20, 2004

(86) PCT No.: PCT/IL2004/001149
§ 371 (c)(1),
(2), (4) Date: Aug. 8, 2008

(87) PCT Pub. No.: WO2005/060346
PCT Pub. Date: Jul. 7, 2005

(65) Prior Publication Data
US 2008/0285057 A1    Nov. 20, 2008

Related U.S. Application Data

(60) Provisional application No. 60/530,909, filed on Dec. 22, 2003.

(51) Int. Cl.
*G01B 11/26* (2006.01)
(52) U.S. Cl. ......................................... 356/138
(58) Field of Classification Search ................ None
See application file for complete search history.

(56) References Cited

U.S. PATENT DOCUMENTS

| | | | | |
|---|---|---|---|---|
| 2,555,101 A | * | 5/1951 | Alvarez et al. | 342/34 |
| 2,677,820 A | | 5/1954 | Bouzitat et al. | |
| 3,404,276 A | * | 10/1968 | Campanella | 250/366 |
| 3,866,229 A | * | 2/1975 | Hammack | 356/141.5 |
| 4,277,170 A | | 7/1981 | Miles | |
| 4,309,758 A | * | 1/1982 | Halsall et al. | 701/23 |
| 4,398,195 A | * | 8/1983 | Dano | 342/46 |
| 4,677,555 A | | 6/1987 | Goyet | |
| 4,700,301 A | | 10/1987 | Dyke | |
| 4,817,000 A | | 3/1989 | Eberhardt | |
| 5,100,229 A | * | 3/1992 | Lundberg et al. | 356/3.12 |

(Continued)

FOREIGN PATENT DOCUMENTS
GB    684315    2/1948

OTHER PUBLICATIONS

International Search Report for international Application No. PCT/IL04/01149 Date of Mailing: Jan. 24, 2006.

(Continued)

*Primary Examiner* — Gregory J Toatley
*Assistant Examiner* — Juan D Valentin, II
(74) *Attorney, Agent, or Firm* — Pearl Cohen Zedek Latzer, LLP

(57) ABSTRACT

A positioning system for determining an angular position of a vehicle (10) with respect to a predetermined position. The system comprises at least one beacon (12) whose position relative to the predetermined position is known, for generating at least one beam of known optical characteristic that allows deriving of the angular position.

28 Claims, 5 Drawing Sheets

U.S. PATENT DOCUMENTS

| | | |
|---|---|---|
| 5,196,900 A | 3/1993 | Pettersen |
| 5,812,267 A | 9/1998 | Everett, Jr. et al. |
| 6,052,181 A * | 4/2000 | Maynard et al. ............ 356/147 |
| 6,138,062 A | 10/2000 | Usami |
| 6,266,142 B1 * | 7/2001 | Junkins et al. ............ 356/623 |
| 6,456,910 B1 | 9/2002 | Roe |
| 7,421,338 B2 * | 9/2008 | Kim et al. ............ 701/207 |
| 2003/0137658 A1 * | 7/2003 | Ohtomo et al. ............ 356/141.4 |

OTHER PUBLICATIONS

European Search Report for EP Application No. 04806680 Date of Search: Aug. 4, 2008.

* cited by examiner

HIGH PRECISION WIDE-ANGLE ELECTRO-OPTICAL POSITIONING SYSTEM AND METHOD

CROSS-REFERENCE TO RELATED APPLICATIONS

This application is a National Phase Application of PCT International Application No. PCT/IL2004/001149, International Filing Date Dec. 20, 2004, claiming priority of U.S. Patent Application, 60/530,909, filed Dec. 22, 2003.

FIELD OF INVENTION

The present invention relates to positioning systems. More particularly it relates to high precision wide-angle electro-optical positioning system and method.

BACKGROUND OF THE INVENTION

Automatic steering for unmanned vehicles, either naval, aerial or ground vehicles exist. During most of the time driving the vehicle around is a rather simple task for most automatic systems, but for more sophisticated tasks, such as taking-off, landing, docking, parking, and air-refueling (these are merely examples of sophisticated tasks) high-accuracy and fast response time are needed.

In most cases, improper maneuvering may cause capital loss.

Many maneuvers can be executed automatically, provided that the guidance system has access to real-time data on the absolute or relative position of the vehicle, approach path and velocity. If programmed correctly, automatic maneuvering systems can make all required decisions without mistakes, thus eliminating the risk of failure due to human error. In addition, automatic maneuvering systems replace trained personnel, thus reducing operation expenses. These facts motivate the use of automatic maneuvering systems.

For low-flying aircraft, such as Unmanned Aerial Vehicles (UAV's), the position signal (for example GPS) is of the same order of magnitude as the error that occurs when calculating velocities and is derived from position error multiplied by the sampling rate. At low altitudes changes in side wind heavily influence the UAV position, thus seriously affecting the reliability of tracking and guidance of the UAV using currently available positioning systems.

For example, most of the UAV's takeoffs and landings are presently human assisted. An external human pilot stands near the runway, watches the vehicle and controls it through the use of a remote control.

An autopilot system guided by a static (land) laser beacon is disclosed in U.S. Pat. No. 6,456,910. The beacon consists of a laser beam shaped as a narrow vertical fan beam that is illuminated in a fixed direction. The vehicle is equipped with a linear photo-detector array spanning the whole vehicle width. This array detects the distance between the beacon beam and the sensor array center, thus deriving a correction signal. This correction signal is fed into the vehicle steering actuator, which corrects the vehicle trajectory to position its center on the beacon beam. The disadvantage in this system is the fact that the beam direction is fixed, and this means that in order to effectively employ this system the vehicle must be limited to a narrow approach path, which is defined by the width of the sensor array. If the beam is not on the array the system is ineffective.

An autopilot system for UAVs is commercially offered by Ruag Aerospace (Switzerland) and called OPATS. This system uses a passive retro-responder on the airplane, and a land based instrument capable of measuring the distance and the azimuth-elevation angles to this responder, thus determining the 3D position of the vehicle in a fixed coordinate system relative to the runaway, much like a RADAR system (only using optical beam rather than RF). The land based instrument is responsible for deriving the location of the UAV and for transmitting control information to the UAV based on the derived location.

It is an object of the present invention to provide a novel accurate positioning system (and method) effective over a broad sector, whose accuracy is fixed and not affected by the size of the broad sector.

Another object of the present invention is to provide such positioning system that is vehicle-based, offering local independence and control, eliminating the need for control signals from an off-board location.

Other objects and advantages will become clear after reading the present specification and considering the accompanying drawings.

BRIEF DESCRIPTION OF THE INVENTION

There is thus provided, in accordance with some preferred embodiments of the present invention, a positioning system for determining angular position of a vehicle with respect to a predetermined position, the system comprising at least one beacon whose position relative to the predetermined position is known, for generating at least one beam of known optical characteristic that allows deriving of the angular position.

Furthermore, in accordance with some preferred embodiments of the present invention, said at least one beam of known optical characteristic comprises laser radiation.

Furthermore, in accordance with some preferred embodiments of the present invention, said at least one beam of known optical characteristic scans a predetermined sector.

Furthermore, in accordance with some preferred embodiments of the present invention, said at least one beam of known optical characteristic scans a predetermined sector back and forth.

Furthermore, in accordance with some preferred embodiments of the present invention, said at least one beam of known optical characteristic comprises two beams, that scan a predetermined sector about the beacon in opposite directions.

Furthermore, in accordance with some preferred embodiments of the present invention, the two beams are synchronized to overlap each other at predetermined angle in the scanned sector.

Furthermore, in accordance with some preferred embodiments of the present invention, said at least one beam is static.

Furthermore, in accordance with some preferred embodiments of the present invention, said characteristic comprises predetermined wavelength.

Furthermore, in accordance with some preferred embodiments of the present invention, said characteristic comprises predetermined polarization.

Furthermore, in accordance with some preferred embodiments of the present invention, said characteristic comprises predetermined intensity.

Furthermore, in accordance with some preferred embodiments of the present invention, said characteristic comprises amplitude modulation frequency.

Furthermore, in accordance with some preferred embodiments of the present invention, said characteristic comprises amplitude modulation contrast.

Furthermore, in accordance with some preferred embodiments of the present invention, there is provided an automated positioning system for determining the angular position, of a vehicle with respect to a known position, using at least one beacon whose position relative to the predetermined position is known, for generating at least one beam of known optical characteristic that allows deriving of the angular position, the system comprising:

> at least one electro-optical sensor for detecting said at least one beam and optical characteristics; and
>
> a logic circuitry onboard the vehicle for computing the angular position of the vehicle with respect to the predetermined position.

Furthermore, in accordance with some preferred embodiments of the present invention, the logic circuitry comprises a processor.

Furthermore, in accordance with some preferred embodiments of the present invention, the logic circuitry comprises logic electronic elements.

Furthermore, in accordance with some preferred embodiments of the present invention, said at least one electro-optical sensor comprises two sensors.

Furthermore, in accordance with some preferred embodiments of the present invention, said at least one electro-optical sensor comprises an array of sensors.

Furthermore, in accordance with some preferred embodiments of the present invention, said at least one electro-optical sensor is provided with a filter.

Furthermore, in accordance with some preferred embodiments of the present invention, said filter is a polarizing filter.

Furthermore, in accordance with some preferred embodiments of the present invention, said filter is a wavelength filter.

Furthermore, in accordance with some preferred embodiments of the present invention, the logic circuitry further generates control commands for controlling the maneuvering actuators of the vehicle.

Furthermore, in accordance with some preferred embodiments of the present invention, the vehicle comprises an unmanned aerial vehicle.

Furthermore, in accordance with some preferred embodiments of the present invention, the vehicle comprises a naval vessel.

Furthermore, in accordance with some preferred embodiments of the present invention, the vehicle comprises a land vehicle.

Furthermore, in accordance with some preferred embodiments of the present invention, there is provided a method for determining the angular position of a vehicle with respect to a predetermined position, the method comprising:

> providing at least one beacon whose position relative to the predetermined position is known, for generating at least one beam of known optical characteristic that allows deriving of the angular position;
>
> detecting said at least one beam using at least one sensor coupled to the vehicle and optical characteristic;
>
> using a logic circuitry onboard the vehicle that connected to said at least one electro-optical sensor, deriving the angular position of the vehicle with respect to the predetermined position.

Furthermore, in accordance with some preferred embodiments of the present invention, said at least one beam is static.

Furthermore, in accordance with some preferred embodiments of the present invention, said at least one beam is scanning.

Furthermore, in accordance with some preferred embodiments of the present invention, two beams are generated, and wherein the characteristics of the two beams comprises the timings of detection by said at least one electro-optical sensor.

Furthermore, in accordance with some preferred embodiments of the present invention, said characteristic comprises predetermined wavelength.

Furthermore, in accordance with some preferred embodiments of the present invention, said characteristic comprises predetermined polarization.

Furthermore, in accordance with some preferred embodiments of the present invention, said characteristic comprises predetermined intensity.

Furthermore, in accordance with some preferred embodiments of the present invention, said characteristic comprises amplitude modulation frequency.

Furthermore, in accordance with some preferred embodiments of the present invention, said characteristic comprises amplitude modulation contrast.

Furthermore, in accordance with some preferred embodiments of the present invention, there is provided an automated method for determining the angular position of a vehicle with respect to a known position, using at least one beacon whose position relative to the predetermined position is known, for generating at least one beam of known optical characteristic that allows deriving of the angular position, the method comprising:

> providing at least one electro-optical sensor for detecting said at least one beam and optical characteristic;
>
> deriving using a logic circuitry onboard the vehicle, the logic circuitry connected to said at least one electro-optical sensor, the angular position of the vehicle with respect to the predetermined position.

Furthermore, in accordance with some preferred embodiments of the present invention, said at least one electro-optical sensor comprises two sensors.

Furthermore, in accordance with some preferred embodiments of the present invention, said at least one electro-optical sensor comprises an array of sensors.

Furthermore, in accordance with some preferred embodiments of the present invention, said at least one electro-optical sensor is provided with a filter.

Furthermore, in accordance with some preferred embodiments of the present invention, said filter is a polarizing filter.

Furthermore, in accordance with some preferred embodiments of the present invention, said filter is a wavelength filter.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention as defined in the appending Claims. Like components are denoted by like reference numerals.

DETAILED DESCRIPTION OF PREFERRED EMBODIMENTS

A positioning system in accordance with a preferred embodiment of the present invention introduces at least one light beacon whose location is known, which is providing at least one vertical fan beam (preferably generated by a laser source), the beam characterized in a predetermined manner. An optical sensor onboard the vehicle is designed to detect the beam as it crosses it and a logic circuit or a processor connected to the sensor is capable of deriving the relative position of the vehicle with respect to the location of the beacon.

A main aspect of the present invention is the provision of a light beacon that encodes an azimuth or elevation angle using certain characteristics of its beam or beams, combined with a sensor on a mobile platform capable of detecting this characteristic and deriving the azimuth/elevation angle.

According to some preferred embodiments of the present invention a proposed positioning system has two main parts:
1. One or more light beacons located in known positions, (e.g. end of a runway)
2. One or more electro-optic sensors, mounted on the mobile platform.

The system allows the mobile platform to accurately detect the azimuth angle with respect to a predefined direction, like runway. In addition the system may also derive the range to the beacon.

Additional parameters, like elevation angle, can be detected too by duplication of the beam generation system (the beacon) in orthogonal orientation.

In order to explain the present invention two embodiments are presented, by way of example to demonstrate the applicability of the invention, some advantages and typical features discussed too. The two embodiments disclosed are:
1. A smart beacon that generates a beam and encodes the azimuth angle using a certain characteristic of the beam, cooperating with a sensor on the mobile platform capable of detecting this characteristic and henceforth capable of detecting the azimuth angle; and
2. A smart beacon that generates a plurality of beams of different optical characteristics that cover a predetermined sector.

In both cases the generated beam is shaped to cover the angular sector of interest, both in elevation and in azimuth.

Figure 1A:
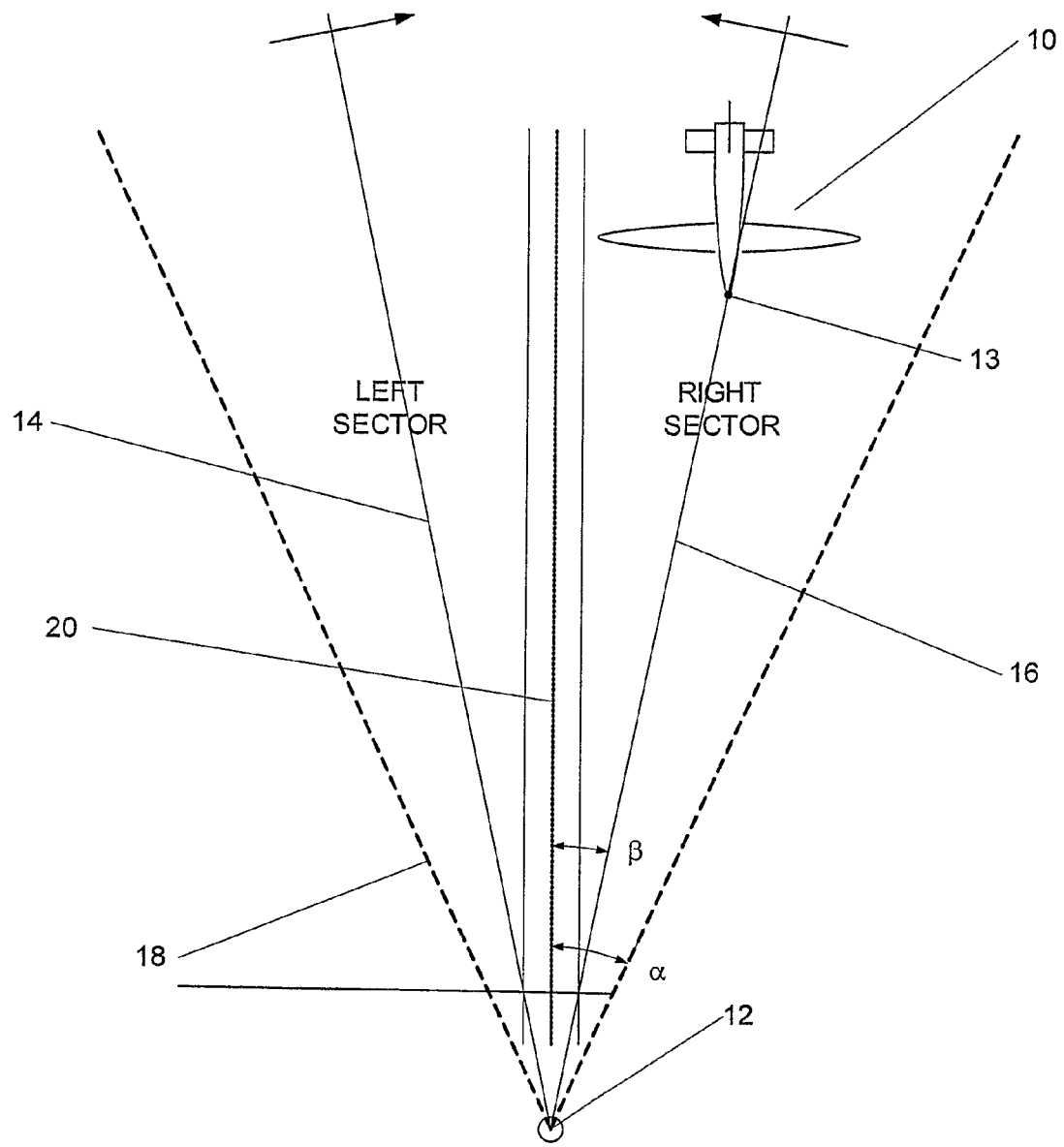
FIG. 1a illustrates a positioning system in accordance with some preferred embodiments of the present invention, with two scanning beams.

Reference is made to FIG. 1a illustrating a positioning system in accordance with some preferred embodiments of the present invention, with two scanning beams.

In this system, the angular information is encoded in the time difference between the arrivals of two scanning beams to an electro-optical sensor that is provided on the mobile platform. There are several ways to do it, and FIG. 1a illustrates only one way.

Figure 1B:
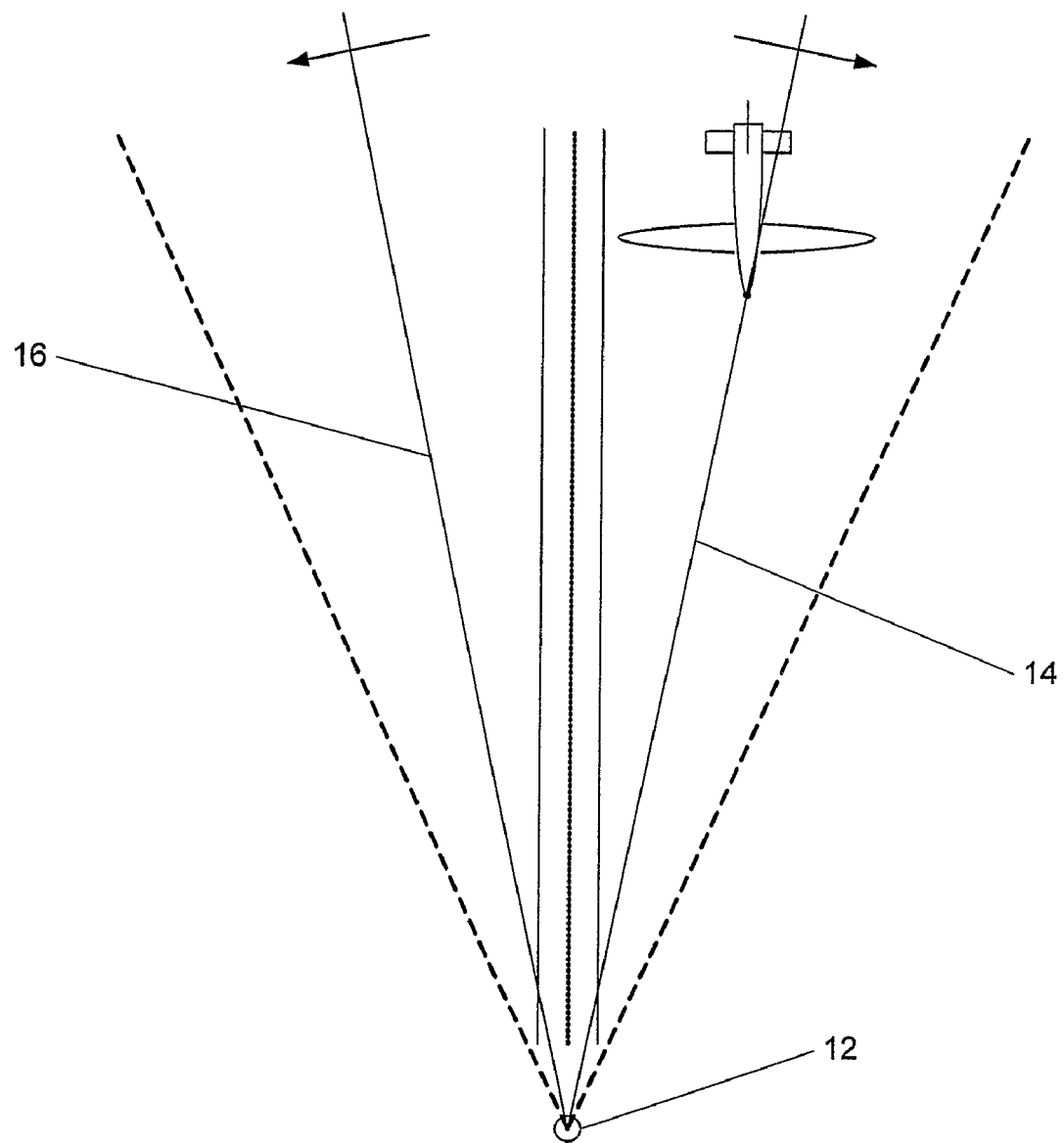
FIG. 1b illustrates the system shown in FIG. 1a, after the beams crossed over.

Consider a beacon 12 system consisting of two scanning laser beams 14, 16, in the form of vertically oriented fans, which scan a common angular three-dimensional sector of interest, defined between limits 18 (defined by angle α, and the opening angle of the fan, not shown in this drawing, as it is perpendicular to the plane of the drawing) The position of the beacon is known with respect to the far end of runway 20 (or any other selected location). One beam scans the sector from left to right, and the other from right to left. Both scans have (as an example) the same period and phase and preferably synchronized to overlap above the runway centerline. The two occurrences in which the two beams hit an electro-optical sensor 13, provided on aircraft 10 are illustrated in FIG. 1a and FIG. 1b. These figures show a scenario of a landing aircraft 10 positioned at an angle β with respect to the landing runway center. Beams 14 (also denoted "A") and 16 (also denoted "B") are the left-to-right and the right-to-left scanning beams respectively. FIGS. 1a and 1b show the occurrences of crossing of beams 16 and 14 respectively over the electro-optical sensor 13 mounted on the airplane. Since the airplane is located in the right sector, beam 16 hits it first. Let us denote the times of arrival of beams 14 and 16 by $\tau_A$ and $\tau_B$ respectively, measuring from the scanning cycle start, and the angular scanning velocity of the beams by ω.

The following relations exist:

$$\tau_A = (\alpha + \beta)/\omega,$$

$$\tau_B = (\alpha - \beta)/\omega,$$

Therefore the angle β can be derived from the following relation:

$$\beta = \omega(\tau_A - \tau_B)/2$$

The angle β is positive for the right sector, and negative for the left sector. In order to determine the sign of β, the sensor must discriminate between beams A and B. This can be accomplished in several ways.

One way of achieving the discrimination is by providing the electro-optical sensor with two receivers. If the apertures of the two receivers are displaced horizontally, it is possible to determine the scan direction by the order of arrivals on these receivers.

Another way to discriminate between the two beams is by using beams of different light intensities. The discrimination between the two beams is achieved by comparing the appropriate sensor's responses, corresponding to the intensities of the beams.

Alternatively, it is possible to differentiate the two beams by employing other optical characteristics, such as polarization or wavelength. Mounting a suitable optical filter in front of the receiver aperture will make each receiver sensitive to a beam with the corresponding characteristics only.

There are several ways to encode the angular information in the arrival times of the two scanning beams, and it is not necessary to employ beams of same angular velocity.

The range may be evaluated using two electro-optical sensors mounted apart as far as possible, e.g. at the far ends of the aircraft wings.

Let us denote the times of arrival of one of the beams on the two electro-optical sensors by $\tau_1$ and $\tau_2$. Then the following relation exists:

$$R = L/(\omega^*(\tau_1 - \tau_2))$$

where R is the distance to the beacon. If the plane is headed precisely towards the beacon, and the wings are horizontal, then L is the actual physical distance between the sensors. Otherwise, L is the length of a double projection of the radius vector connecting the sensors: first projection on the horizontal plane, and the second on a plane perpendicular to the radius vector connecting the plane to the beacon. In the general case, the length L can be computed from the known physical distance between the sensors and geometrical data derived from the plane navigation system.

Now attention is directed to a second type of positioning system in accordance with some preferred embodiments of the present invention: A system with a beacon generating a wide beam with angularly encoded characteristics. In its simplest application the beam is fixed in direction covering a broad sector.

One can use various characteristics of light in order to encode the angular information, such as:
1. Wavelength
2. Polarization
3. Amplitude modulation frequency
4. Amplitude modulation contrast The beam can be either static or scanning. In the first case, the relevant characteristic is encoded by a suitable spatial modulator, and in the second case by a time-dependent modulator synchronized with the scanning pattern.

Figure 2:
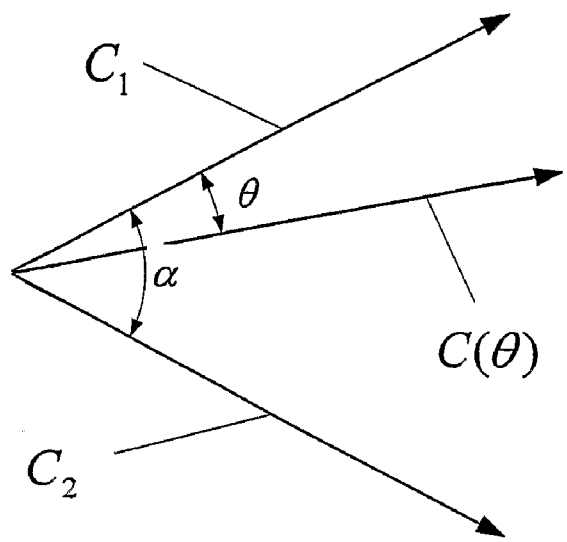
FIG. 2 illustrates a way of encoding the angular information into a beam.

A general way of encoding the angular information by a characteristic C, as illustrated in FIG. 2, is to set the values of C at an angle θ to $$C(\theta) = C_1 + f(\theta) C_2$$

Where $C_1$ and $C_2$ are certain edge values of the characteristic, and $f(\theta)$ is any monotonous function of θ with edge values 0 for θ=0 and 1 for θ=α; where a is the beacon beam angular extension. The corresponding sensor mounted on the aircraft must be capable of measuring the value C. From this value the value of f can be derived, and from it one can derive the angle θ.

Again, two separated sensors can measure the range. Denoting by δ the angle difference between the reading of the two sensors, the range R is given by $$R = L/\delta$$

where L is as defined hereinabove.

Figure 3:
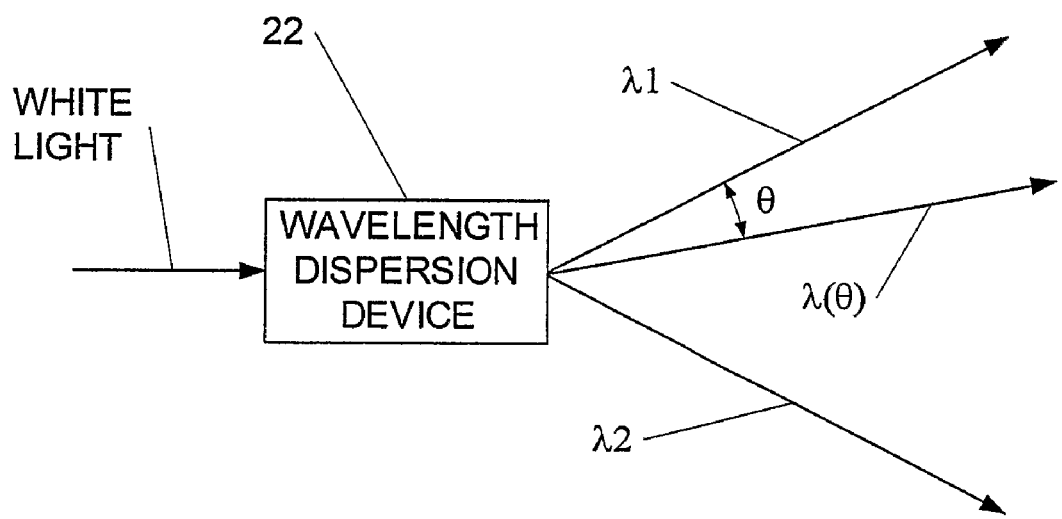
FIG. 3 illustrates wavelength encoding using light dispersion (static wavelength encoding).

Static wavelength encoding can be achieved by dispersing a collimated white beam with a prism or by using a grating or other wavelength dispersion device 22 as illustrated in FIG. 3, for obtaining beams of different wavelengths λ(θ) (defined by angle θ and limited between λ1 and λ2).

Figure 4:
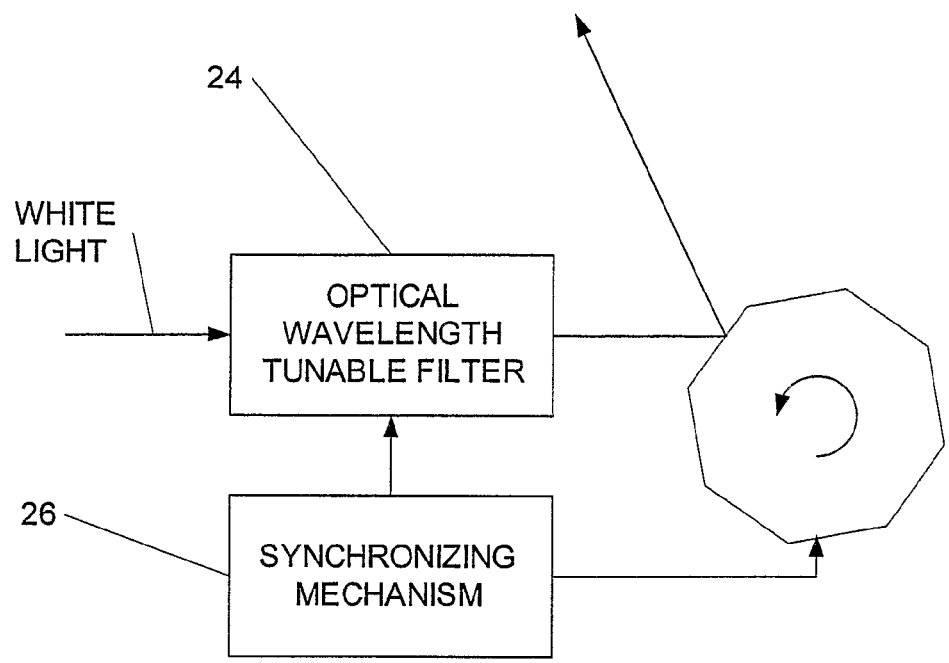
FIG. 4 illustrates scanning wavelength encoding.

Scanning wavelength encoding may be achieved with a fast tunable optical wavelength filter 24 (like a scanning interferometer or acousto-optic filter), synchronizing mechanism control 26 and rotating reflective polygon 28. This is illustrated schematically in FIG. 4.

The corresponding sensor mounted on the aircraft should be capable of detecting wavelength. This can be accomplished by a miniature spectrometer.

In polarization encoded beam each azimuthal angle is characterized by a different optical polarization state. For such encoding, one chooses two orthogonal polarization states $P_1$ and $P_2$ for the edge values.

The corresponding sensor mounted on the aircraft should be equipped with two optical receivers, each with a polarizing filter for one of the polarization states $P_1$ and $P_2$. From the ratio of the responses of the two receivers one can derive the value of f, and then the value of θ.

Static polarization encoding may be accomplished with a suitable spatial polarization modulator. Scanning polarization encoding may be accomplished with a fast elasto-optic polarization modulator.

In principle, $P_1$ and $P_2$ can be any pair of orthogonal polarization states. In practice it may be advantageous to use the left and right circular polarization states for $P_1$ and $P_2$. This will eliminate possible error due to rotation of the vehicle.

In modulation frequency encoded beam each azimuthal angle is characterized by a different amplitude modulation frequency.

The corresponding sensor should have a Fourier analyzer to measure the modulation frequency g.

Static modulation frequency encoding can be done with an appropriate spatial modulator, such as digital micromirror (DMD) device (typically used in image projection devices).

Scanning frequency can be accomplished with a frequency-ramp (chirp) RF (radio-frequency) modulator for the optical amplitude.

It is possible to modulate the beacon's beam amplitude with two harmonics at frequencies $f_1$ and $f_2$, with amplitudes $A_1$ and $A_2$ respectively. The characteristic C may be defined as the ratio $$\gamma = A_1/A_2.$$

Static γ encoding can be accomplished with a suitable spatial light modulator.

Scanning γ encoding can be achieved by two ramped amplitude modulators.

Figure 5:
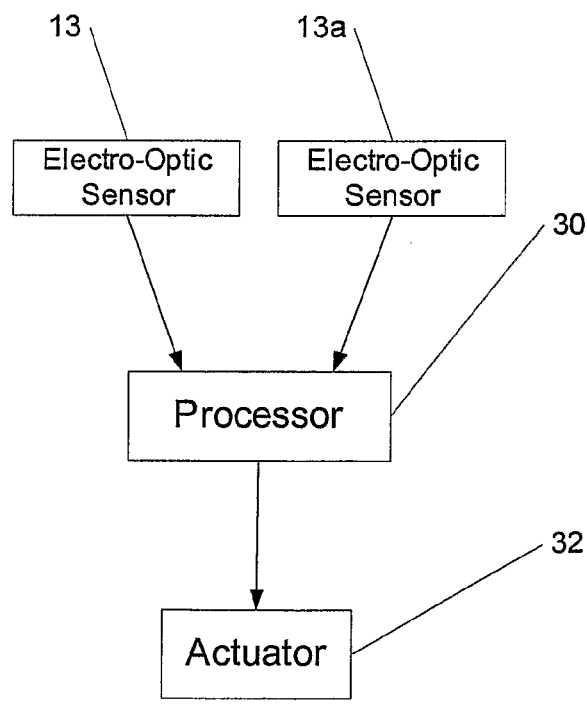
FIG. 5 illustrates a block diagram of a positioning system onboard in accordance with some preferred embodiments of the present invention.

FIG. 5 illustrates a block diagram of an automated positioning system onboard in accordance with some preferred embodiments of the present invention. One or more sensors 13 (13a) connected to a central processing unit 30, that computes the relative position of the vehicle with respect to the position of the beacon and possibly also the range of the vehicle form the predetermined position in the manner discussed hereinabove, and sends control commands to the corresponding actuators 32 to control the vehicle maneuver Alternatively the processing unit may be replaced by logic circuitry that generates control commands to control actuators.

Figure 6:
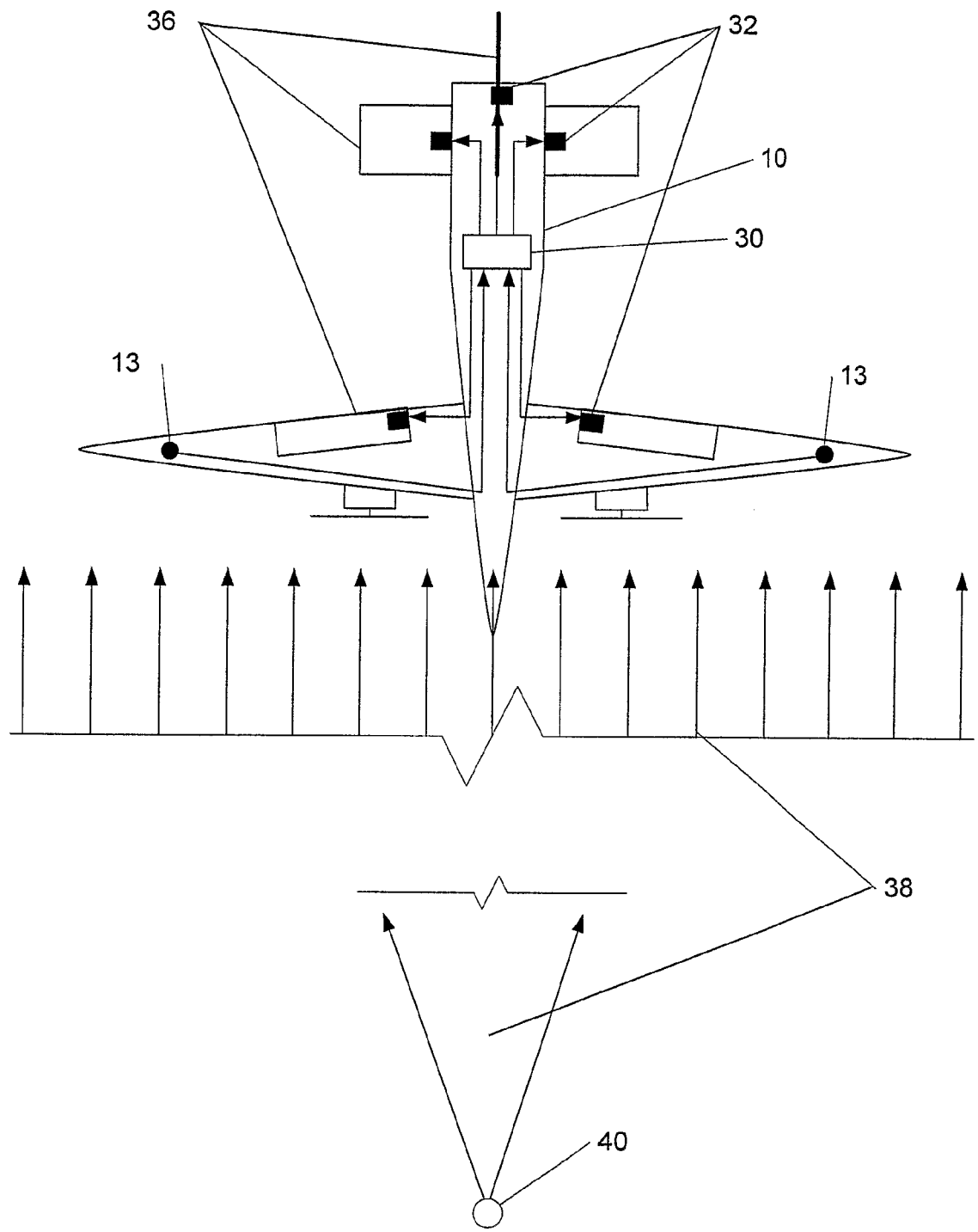
FIG. 6 illustrates another preferred embodiment for a positioning system in accordance with the present invention.

FIG. 6 illustrates another preferred embodiment for a positioning system in accordance with the present invention. The system depicted is based on a beacon 40 that radiates a static wide-angle beam 38 characterized in that angular information is encoded in the form of static modulation frequency encoding that can be done with an appropriate spatial modulator. Here the modulator used is a light beam that is reflected off a digital micromirror array, the array comprising a plurality of independently controlled mirrors whose orientation is manipulated so as to produce a broad beam with spatial amplitude modulations (or other optical characteristic). Sensors 13 on vehicle 10 (here unmanned aerial vehicle, UAV) located on different parts of the vehicle (in front) detect different information that is decoded by an on-board processor 30, which in turn, following a predetermined maneuvering algorithm, sends control commands that actuates maneuver actuators 32 that operate the steering 36 (such as aileron, rudder, flaps, etc.) of the vehicle.

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following Claims.

The invention claimed is:

1. An automated positioning system for determining an angular deviation of a vehicle from a predetermined path, the system comprising:
   an electro-optical sensor onboard the vehicle for detecting two beams that scan across at least a sector of interest in opposite directions and that are synchronized with each-other so as to substantially overlap in the direction of the predetermined path, said two beams originating from known positions relative to the predetermined path; and
   a logic circuitry on board the vehicle for determining a difference in time of detection of said two beams, the difference in time being indicative of the angular deviation.

2. The system as claimed in claim 1, wherein the logic circuitry comprises a processor.

3. The system as claimed in claim 1 wherein the logic circuitry is configured to determine a scanning direction of a beam of said at feast two beams across the sensor.

4. The system as claimed in claim 1, wherein the electro-optical sensor comprises two sensing elements.

5. The system as claimed in claim 1, wherein the electro-optical sensor is configured to distinctly detect an optical characteristic of a beam of said two beams.

6. The system as claimed in claim 1, wherein the electro-optical sensor is provided with a filter.

7. The system as claimed in claim 6, wherein said filter is selected from a group consisting of: polarizing filter, wavelength filter.

8. The system as claimed in claim 1, further comprising at least one off board beacon for generating said two beams and wherein said known positions coincide.

9. The system as claimed in claim 8, wherein said at least one beacon comprises two beacons each for generating a beam of said at least two beams.

10. The system as claimed in claim 1, wherein a beam of said at least two beams sweeps back and forth across the sector.

11. The system as claimed in claim 1, wherein said two beams are characterized by optical characteristics so as to allow determining of the scanning direction or azimuth information associated with each beam.

12. The system as claimed in claim 11, wherein the optical characteristics are selected from a group of optical characteristics: polarization, wavelength, intensity, amplitude modulation frequency, amplitude modulation contrast.

13. The system as claimed in claim 1, further comprising a beam that is characterized as spanning the entire sector and by an optical characteristic that is spatially modulated so as to encode angular information of that beam.

14. The system of claim 1, wherein the logic circuitry is further configured to control commands for controlling maneuvering actuators of the vehicle.

15. The system of claim 1, wherein the vehicle is selected from a group consisting of: an unmanned aerial vehicle, a naval vessel, a land vehicle.

16. An automated positioning method for determining an angular deviation of a vehicle from a predetermined path, using two beams sweeping across at least a sector of interest in opposite directions and being synchronized so as to substantially overlap in the direction of the predetermined path, each beam of said two beams originating from a known position relative to the predetermined path, the method comprising:
detecting by an electro-optical sensor onboard the vehicle of said two beams; and
processing by a logic circuitry on board the vehicle of signals generated by the sensor so as to determine a difference in time of detection of said two beams and processing the difference so as to determine the angular deviation.

17. The method as claimed in claim 16, comprising determining a sweeping direction of a beam of said at least two beams across the sensor.

18. The method as claimed in claim 17, wherein the sensor comprises two sensing elements.

19. The method as claimed in claim 16, comprising distinctly detecting different optical characteristics of a beam of said at least two beams.

20. The method as claimed in claim 16, further comprising providing at least one off board beacon for generating said at least two beams.

21. The method as claimed in claim 20, comprising generating by said at least one beacon a beam of said at least two beams such that the beam sweeps back and forth across the sector.

22. The method as claimed in claim 20, wherein said at least one beacon comprises a single beacon.

23. The method as claimed in claim 20, wherein said at least one beacon comprises two beacons.

24. The method as claimed in claim 16, comprising characterizing a beam of said at least two beams by optical characteristics so as to allow determining of a sweeping direction or azimuth associated with the beam.

25. The method as claimed in claim 24, wherein the optical characteristics are selected from a group of optical characteristics: polarization, wavelength, intensity, amplitude modulation frequency, amplitude modulation contrast.

26. The method as claimed in claim 16, wherein a beam of said at least two beams is characterized as spanning the entire sector and by an optical characteristic that is spatially modulated so as to encode angular information of that beam.

27. The method of claim 16, comprising generating control commands by the logic circuitry for controlling the maneuvering actuators of the vehicle.

28. The method of claim 16, wherein the vehicle is selected from a group consisting of: an unmanned aerial vehicle, a naval vessel, a land vehicle.

* * * * *